US012804122B2

(12) United States Patent
Sorahana

(10) Patent No.: US 12,804,122 B2
(45) Date of Patent: Nov. 17, 2026

(54) STEREOSCOPIC IMAGE DISPLAY DEVICE AND STEREOSCOPIC IMAGE DISPLAY METHOD

(71) Applicant: SONY GROUP CORPORATION, Tokyo (JP)

(72) Inventor: Toshiaki Sorahana, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/993,005

(22) PCT Filed: Jun. 16, 2023

(86) PCT No.: PCT/JP2023/022356
§ 371 (c)(1),
(2) Date: Jan. 10, 2025

(87) PCT Pub. No.: WO2024/029212
PCT Pub. Date: Feb. 8, 2024

(65) Prior Publication Data

US 2026/0019554 A1 Jan. 15, 2026

(30) Foreign Application Priority Data

Aug. 3, 2022 (JP) ................................ 2022-123764

(51) Int. Cl.
*H04N 13/344* (2018.01)
*G02B 25/00* (2006.01)
(Continued)

(52) U.S. Cl.
CPC ......... *H04N 13/344* (2018.05); *G02B 25/001* (2013.01); *G02B 27/0172* (2013.01);
(Continued)

(58) Field of Classification Search
CPC .. H04N 13/344; H04N 13/324; H04N 13/346; G02B 25/001; G02B 27/0172
See application file for complete search history.

(56) References Cited

U.S. PATENT DOCUMENTS

2014/0043335 A1* 2/2014 Kobayashi .............. G06T 19/20
345/427
2022/0157265 A1 5/2022 Lee et al.
2022/0283431 A1* 9/2022 Hua ........................ G06F 30/10

FOREIGN PATENT DOCUMENTS

JP 2002-214566 A 7/2002
JP 2007-017558 A 1/2007
(Continued)

OTHER PUBLICATIONS

International Search Report and Written Opinion of PCT Application No. PCT/JP2023/022356, issued on Aug. 22, 2023, 11 pages of ISRWO.
(Continued)

*Primary Examiner* — Mishawn N. Hunter
(74) *Attorney, Agent, or Firm* — CHIP LAW GROUP

(57) ABSTRACT

An object of the present invention is to provide a stereoscopic image display device and a stereoscopic image display method of suppressing vergence accommodation conflict. The stereoscopic image display device of the present includes an image generation unit that generates a light field image at a predetermined viewpoint position; and an image display unit that displays an image having a depth in each of both eyes of a user on the basis of the light field image, in which the image display unit has a plurality of stacked display surfaces, and the plurality of display surfaces includes at least one first display surface and at least one second display surface having a higher light transmittance than the first display surface.

16 Claims, 11 Drawing Sheets

(51) Int. Cl.

| | |
|---|---|
| ***G02B 27/01*** | (2006.01) |
| ***H04N 13/324*** | (2018.01) |
| ***H04N 13/346*** | (2018.01) |

(52) U.S. Cl.
CPC ......... *H04N 13/324* (2018.05); *H04N 13/346* (2018.05); *G02B 2027/011* (2013.01)

(56) References Cited

FOREIGN PATENT DOCUMENTS

| | | | |
|---|---|---|---|
| JP | 2011-033819 | A | 2/2011 |
| JP | 2017-515162 | A | 6/2017 |
| JP | 2019-535156 | A | 12/2019 |
| JP | 2023-009467 | A | 1/2023 |
| WO | 2019/198784 | A1 | 10/2019 |
| WO | 2021/182265 | A1 | 9/2021 |

OTHER PUBLICATIONS

Hirsch, et al., "ACM SIGGRAPH 2012 Emerging Technologies", Aug. 5, 2012, No. 24, 01 page.

* cited by examiner

STEREOSCOPIC IMAGE DISPLAY DEVICE AND STEREOSCOPIC IMAGE DISPLAY METHOD

CROSS REFERENCE TO RELATED APPLICATIONS

This application is a U.S. National Phase of International Patent Application No. PCT/JP2023/022356 filed on Jun. 16, 2023, which claims priority benefit of Japanese Patent Application No. JP 2022-123764 filed in the Japan Patent Office on Aug. 3, 2022. Each of the above-referenced applications is hereby incorporated herein by reference in its entirety.

TECHNICAL FIELD

The present technology relates to a stereoscopic image display device and a stereoscopic image display method.

BACKGROUND ART

Conventionally, in order to implement extended reality (XR) including augmented reality (AR), virtual reality (VR), mixed reality (MR), and the like, techniques for allowing a user to observe an image having a depth have been developed. For example, Patent Documents 1 to 4 disclose techniques for allowing a user to observe an image having a depth.

CITATION LIST

Patent Document

Patent Document 1: WO 2019/198784 A
Patent Document 2: Japanese Patent Application Laid-Open No. 2007-17558
Patent Document 3: Japanese Patent Application Laid-Open No. 2011-33819
Patent Document 4: Japanese Patent Application Laid-Open No. 2002-214566

SUMMARY OF THE INVENTION

Problems to be Solved by the Invention

Vergence of both eyes of the user is induced in order to cause the user to observe the image having a depth, but focus adjustment is fixed on a display surface. Therefore, it is known that vergence accommodation conflict (VAC) is caused. The vergence accommodation conflict is known to cause 3D sickness, eye strain, headache, and the like. To suppress the vergence accommodation conflict, an age of the user who uses the stereoscopic image display device and a time of use are limited.

Therefore, a main object of the present technology is to provide a stereoscopic image display device and a stereoscopic image display method of suppressing vergence accommodation conflict.

Solutions to Problems

The present technology provides a stereoscopic image display device including: an image generation unit that generates a light field image at a predetermined viewpoint position; and an image display unit that displays an image having a depth in each of both eyes of a user on the basis of the light field image, in which the image display unit has a plurality of stacked display surfaces, and the plurality of display surfaces includes at least one first display surface and at least one second display surface having a higher light transmittance than the first display surface.

The second display surface may be a monochrome display surface.

Two or more of the plurality of display surfaces may be the first display surfaces.

Two or more of the plurality of display surfaces may be the second display surfaces.

Light incident on the both eyes may be transmitted through the second display surface and the first display surface in this order.

The plurality of display surfaces may have different resolutions.

At least one of the plurality of display surfaces may include a spatial light modulator.

At least one of the plurality of display surfaces may include an LCD.

At least one of the plurality of display surfaces may include an OLED.

The image display unit may further include an eyepiece.

The image generation unit may correct the light field image according to a magnification or an aberration of the eyepiece, or both of the magnification and the aberration.

The eyepiece may be a freeform surface prism.

The stereoscopic image display device may further include a shape acquisition unit that images a stereoscopic shape to obtain stereoscopic information, and the image generation unit may generate the light field image on the basis of the stereoscopic information.

The stereoscopic information may include luminance information, depth information, or both of the luminance information and the depth information.

The display surface may be a head mounted display disposed in front of the both eyes.

Furthermore, the present technology provides a stereoscopic image display method including: generating a light field image at a predetermined viewpoint position; and causing light to be incident on each of both eyes of a user in order to display an image having a depth on the basis of the light field image, in which the light is transmitted through at least one first display surface and at least one second display surface having a higher light transmittance than the first display surface.

According to the present technology, it is possible to provide a stereoscopic image display device and a stereoscopic image display method of suppressing vergence accommodation conflict. Note that the effects described herein are not necessarily restrictive, and any of the effects described in the present disclosure may be exhibited.

MODE FOR CARRYING OUT THE INVENTION

Figure 1:
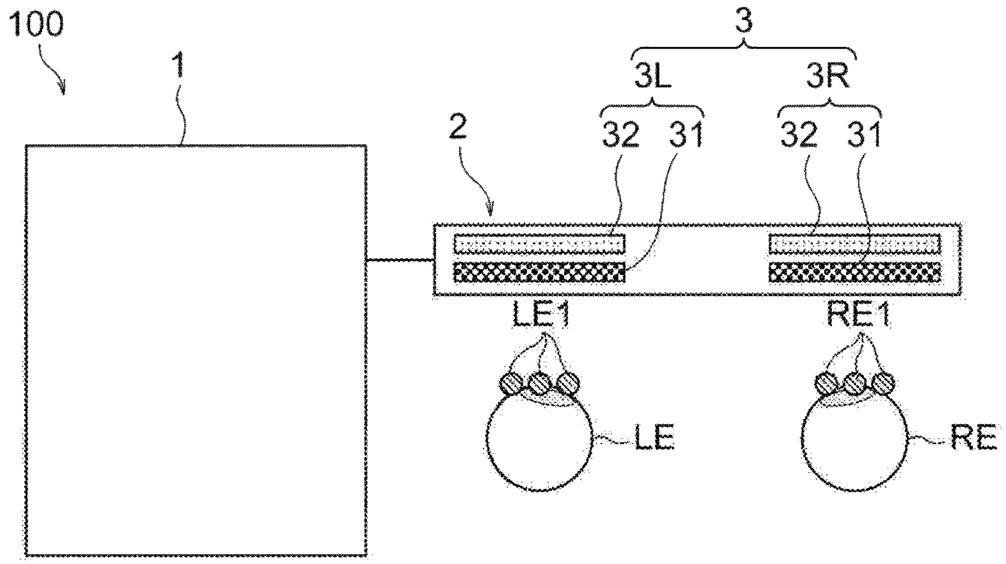
FIG. 1 is a schematic diagram illustrating a configuration example of a stereoscopic image display device 100 according to an embodiment of the present technology.

Hereinafter, preferred embodiments for carrying out the present technology will be described with reference to the drawings. Note that the embodiments to be described below each illustrates an example of a representative embodiment of the present technology, and the scope of the present technology is not limited by this. Furthermore, in the present technology, any of the following examples and modifications thereof can be combined.

In the following description of the embodiments, the configuration may be described using terms with "substantially" such as substantially parallel or substantially orthogonal. For example, "substantially parallel" means not only being completely parallel, but also includes being substantially parallel, that is, a state shifted by, for example, about several percent from the completely parallel state. This similarly applies to other terms with "substantially". Furthermore, each drawing is a schematic view and is not necessarily strictly illustrated.

Unless otherwise specified, in the drawings, "upper" means an upward direction or an upper side in the drawing, "lower" means a downward direction or a lower side in the drawing, "left" means a leftward direction or a left side in the drawing, and "right" means a rightward direction or a right side in the drawing. Furthermore, in the drawings, the same or equivalent elements or members are denoted by the same reference signs, and redundant description will be omitted.

The description is given in the following order.

1. First Embodiment (Example 1 of Stereoscopic Image Display Device)
   (1) Overview
   (2) Image display unit
   (3) Image generation unit
   (4) Simulation results
2. Second Embodiment (Example 2 of Stereoscopic Image Display Device)
3. Third Embodiment (Example 3 of Stereoscopic Image Display Device)
4. Fourth Embodiment (Example 4 of Stereoscopic Image Display Device)
5. Fifth Embodiment (Example of Stereoscopic Image Display Method)

1. First Embodiment (Example 1 of Stereoscopic Image Display Device)

[(1) Overview]

The present technology provides a stereoscopic image display device including: an image generation unit that generates a light field image at a predetermined viewpoint position; and an image display unit that displays an image having a depth in each of both eyes of a user on the basis of the light field image, in which the image display unit has a plurality of stacked display surfaces, and the plurality of display surfaces includes at least one first display surface and at least one second display surface having a higher light transmittance than the first display surface.

A configuration example of the stereoscopic image display device according to the embodiment of the present technology will be described with reference to FIG. 1. FIG. 1 is a block diagram illustrating a configuration example of a stereoscopic image display device 100 according to the embodiment of the present technology. As illustrated in FIG. 1, the stereoscopic image display device 100 includes an image generation unit 1 and an image display unit 2.

The image generation unit 1 generates a light field image at a predetermined viewpoint position. The light field image is an image for displaying a light field. The light field is a type of method of reproducing a three-dimensional video, and is a method of expressing an intensity of a light ray by four parameters of a position and an angle.

The image display unit 2 has a plurality of stacked display surfaces 3. Although not illustrated, the image display unit 2 may further include a light source. The light field image generated by the image generation unit 1 is displayed on each of the plurality of display surfaces 3. The light field is generated on the basis of the light field image. An optical path of the light field emitted from a left-eye display surface 3L reaches a left eye LE of a user. A viewpoint group LE1 is formed on a cornea of the left eye LE. The optical path of the light field emitted from a right-eye display surface 3R reaches a right eye RE of the user. A viewpoint group RE1 is formed on a cornea of the right eye RE.

Different light fields with different viewpoints are respectively displayed on the left-eye display surface 3L and the right-eye display surface 3R. Thereby, the image display unit 2 can display an image having a depth in each of the both eyes of the user on the basis of the light field image. Since the present technology uses the light field method, it is possible to express a continuous depth instead of a discrete depth. Note that techniques related to a tensor display that expresses a depth by displaying an image on each of the plurality of display surfaces 3 are described in the following Non-Patent Documents.

Non-Patent Document: Matthew Hirsch, Douglas Lanman, Gordon Wetzstein, Ramesh Raskar, ACM SIGGRAPH 2012 Emerging Technologies, 2012, No. 24, pp. 1

Conventionally, vergence of both eyes of a user is induced in order to cause the user to observe an image having a depth, but focus adjustment is fixed on a display surface. Therefore, it is known that vergence accommodation conflict (VAC) is caused. The vergence accommodation conflict is known to cause 3D sickness, eye strain, headache, and the like. To suppress the vergence accommodation conflict, the age of the user who uses a stereoscopic image display device and the time of use are sometimes limited.

Examples of a technique for suppressing the vergence accommodation conflict include a light field method and a super multi-eye method of generating light ray information, a hologram method of generating an optical wavefront, and a multiple virtual image plane method of temporally and spatially multiplexing virtual image planes.

The light field method used by the present technology is a method of generating four-dimensional information in total of a two-dimensional position and a two-dimensional direction of a light ray. For example, a head mounted display (HMD) using a light field method can reproduce five-dimensional information by expressing the five-dimensional information in a video manner, so that a virtual space close to a real space can be constructed.

In Patent Document 1 (International Publication No. 2019/198784), a light field that reproduces a light ray emitted from a surface of a virtual three-dimensional shape is configured by displaying a predetermined image on each of a plurality of stacked displays. The generation of the light field enables continuous depth representation, and suppression of the vergence accommodation conflict can be expected.

However, since the plurality of displays is stacked, a transmittance of image light decreases, and a luminance significantly decreases. For example, it is assumed that two displays that display color images are stacked, one display has a light transmittance of 0.6%, and the other display has a light transmittance of 1.5%. At this time, even if the luminance of a light source is about 140,000 nit, the luminance of the image light transmitted through the two displays may decrease to about 13 nit. As a result, for example, visibility may be deteriorated, or VR sickness due to a decrease in refresh rate may occur.

Furthermore, in Patent Document 1, the light field is not corrected according to a longitudinal magnification, a lateral magnification, a distortion aberration, and a curvature aberration by an eyepiece. Therefore, the light field may not be visually recognized at a correct position.

Patent Document 2 (Japanese Patent Application Laid-Open No. 2007-17558) describes a volume display device that draws an image over multiple depths. This device includes a three-dimensional display unit that displays a depth image of each of a right-eye image and a left-eye image in a superimposed manner.

However, since the plurality of displays is stacked, the transmittance of the image light decreases, and the luminance significantly decreases. As a result, for example, the visibility may be deteriorated, or the VR sickness due to a decrease in refresh rate may occur. Furthermore, since there is no function to generate a light field, continuous depth reproduction is difficult.

Patent Document 3 (Japanese Patent Application Laid-Open No. 2011-33819) describes a three-dimensional image display device configured by an electronic display using a coarse integral volume display method capable of reducing the vergence accommodation conflict by combining a color panel and a monochrome panel. However, by use of a condensing system array, the configuration becomes complicated and the optical path becomes long, so that there is room for improvement in miniaturization and weight reduction of the device.

Patent Document 4 (Japanese Patent Application Laid-Open No. 2002-214566) describes a three-dimensional display method of generating a three-dimensional stereoscopic image by displaying two-dimensional images on a plurality of display surfaces at different depth positions as viewed from an observer. However, since there is no function to generate a light field, continuous depth reproduction is difficult. Furthermore, the two-dimensional images are not corrected according to the longitudinal magnification, lateral magnification, distortion aberration, and curvature aberration by an eyepiece. Therefore, correct depth representation is difficult.

[(2) Image Display Unit]

To solve this problem, in the present technology, the plurality of display surfaces 3 included in the image display unit 2 includes at least one first display surface 31 and at least one second display surface 32 having a higher light transmittance than the first display surface 31. Thereby, the light transmittance of the plurality of display surfaces 3 as a whole increases. As a result, the vergence accommodation conflict can be suppressed.

Embodiments of the first display surface 31 and the second display surface 32 are not particularly limited as long as the second display surface 32 has a higher light transmittance than the first display surface 31. As an example of the embodiments, preferably, the first display surface 31 is a color display surface (for example, a color display), and the second display surface 32 is a monochrome display surface (for example, a monochrome display). By including the color display surface, the image display unit 2 can display a color image. The monochrome display surface has a higher light transmittance than the color display surface because a color filter is not mounted. Therefore, by including at least one monochrome display surface, the light transmittance of the plurality of display surfaces 3 as a whole is significantly increased. As a result, the vergence accommodation conflict can be suppressed.

The image display unit 2 does not use a condensing system array as in the technique described in Patent Document 3. Therefore, the configuration is simplified, and the optical path is shortened, so that the size and weight can be reduced.

Moreover, the image generation unit 1 generates a light field image at a predetermined viewpoint position. Therefore, continuous depth representation is possible. These effects similarly occur in other embodiments to be described below. Therefore, in other embodiments, repeated description thereof may be omitted.

Figure 2:
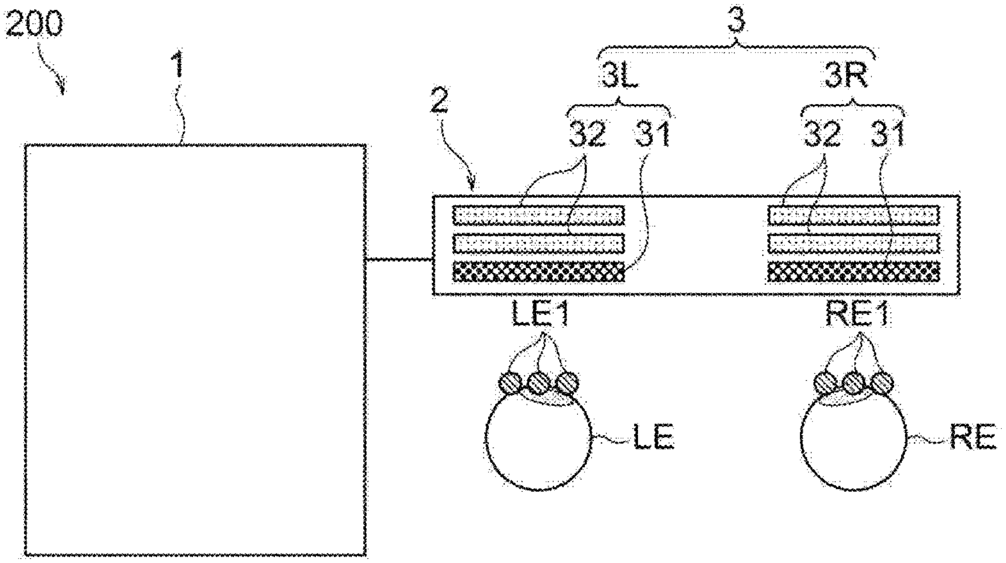
FIG. 2 is a schematic diagram illustrating a configuration example of a stereoscopic image display device 200 according to an embodiment of the present technology.

The type and the number of the display surfaces 3 are not particularly limited. The number of the display surfaces 3 may be two or more, and may be three or more. Furthermore, two or more of the plurality of display surfaces 3 may be the second display surfaces 32. This point will be described with reference to FIG. 2. FIG. 2 is a block diagram illustrating a configuration example of a stereoscopic image display device 200 according to an embodiment of the present technology. As illustrated in FIG. 2, two of the three display surfaces 3 are the second display surfaces 32. Thereby, for example, the light transmittance becomes higher than that of a configuration in which all of the three display surfaces 3 are the first display surfaces 31.

Figure 3:
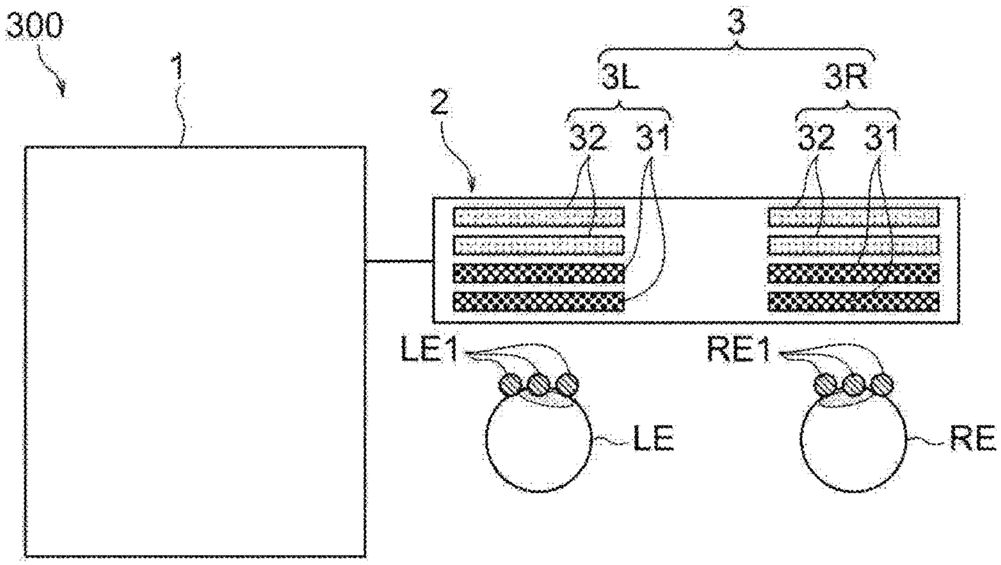
FIG. 3 is a schematic diagram illustrating a configuration example of a stereoscopic image display device 300 according to an embodiment of the present technology.

Furthermore, two or more of the plurality of display surfaces 3 may be the first display surfaces 31. This point will be described with reference to FIG. 3. FIG. 3 is a block diagram illustrating a configuration example of a stereoscopic image display device 300 according to an embodiment of the present technology. As illustrated in FIG. 3, two of the four display surfaces 3 are the first display surfaces 31, and the remaining two are the second display surfaces 32. Thereby, for example, the light transmittance becomes higher than that of a configuration in which all of the four display surfaces 3 are the first display surfaces 31.

The order of the stacked first display surface 31 and second display surface 32 is also not particularly limited. Light incident on the both eyes may be transmitted through the first display surface 31 and the second display surface 32 in this order. The light incident on the both eyes may be transmitted through the second display surface 32 and the first display surface 31 in this order. Alternatively, the light incident on the both eyes may be transmitted through the second display surface 32, the first display surface 31, and the second display surface 32 in this order. Note that, in a simulation, when the light incident on the both eyes is transmitted through the second display surface 32 and the first display surface 31 in this order, that is, when the second display surface 32 is disposed on a side farther from the both eyes than the first display surface 31 as illustrated in FIG. 1, a good result is sometimes obtained.

The plurality of display surfaces 3 may have different resolutions or have the same resolution. For example, by lowering the resolution, an aperture ratio for each pixel increases, so that the light transmittance can be increased. Furthermore, since the resolutions of the plurality of display surfaces 3 are different from each other, the number of options of the display surfaces 3 increases.

At least one of the plurality of display surfaces 3 may include, for example, a spatial light modulator (SLM). The spatial light modulator can modulate light by controlling distribution (for example, phase, amplitude, polarization, and the like) of light from the light source. For example, the spatial light modulator having the size of one pixel of about 1/10000 mm and a high modulation speed can be used in the stereoscopic image display device.

At least one of the plurality of display surfaces 3 may include, for example, a liquid crystal display (LCD).

At least one of the plurality of display surfaces 3 may include, for example, an organic light emitting diode (OLED). At this time, the OLED includes a light source. Since the OLED is thinner and lighter than the LCD, it can contribute to downsizing and weight reduction of the stereoscopic image display device. Thereby, in a case where the stereoscopic image display device is, for example, an HMD, the stereoscopic image display device can be used for a long time. Note that since it is difficult to control the light transmittance of the OLED, the OLED is preferably disposed at a position farthest from the both eyes. For example, in FIG. 1, the second display surface 32 preferably includes an OLED.

[(3) Image Generation Unit]

Figure 4:
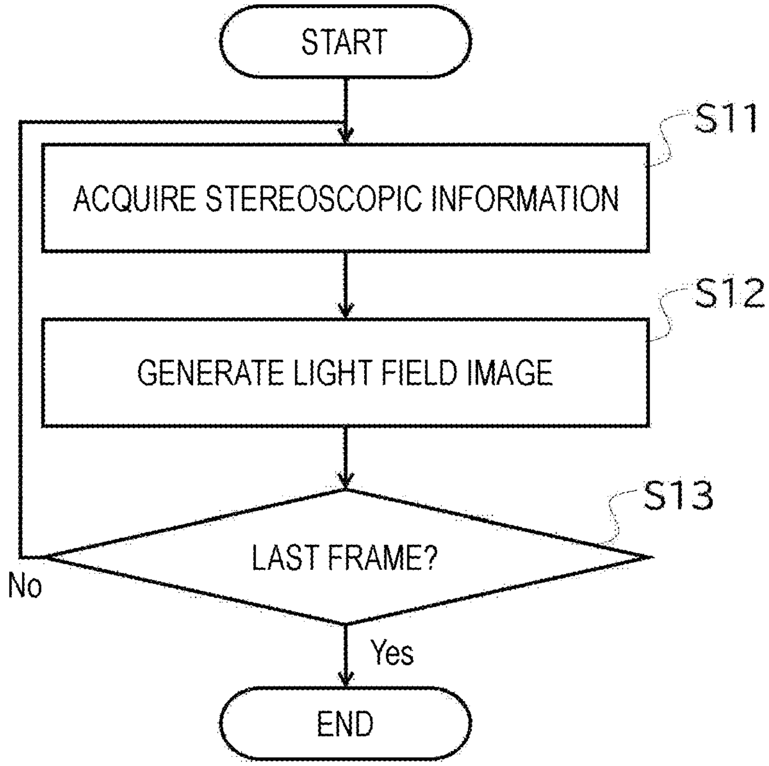
FIG. 4 is a flowchart illustrating an example of a flow of processing of an image generation unit 1 according to the embodiment of the present technology.

A flow of processing of the image generation unit 1 will be described with reference to FIG. 4. FIG. 4 is a flowchart illustrating an example of a flow of processing of the image generation unit 1 according to the embodiment of the present technology.

As illustrated in FIG. 4, first, in step S11, the image generation unit 1 acquires stereoscopic information. This stereoscopic information is, for example, information obtained by multi-view imaging a target object from a predetermined viewpoint position by a light field camera (for example, by a camera array method, an encoding aperture method, a microlens array method, or the like). Alternatively, the stereoscopic information may be, for example, information obtained by multi-view rendering the target object from a predetermined viewpoint position using 3DCG software. Alternatively, the stereoscopic information may be depth (depth) information acquired using a time of flight (ToF) sensor, a LiDAR unit, or the like. Furthermore, the image generation unit 1 may acquire the stereoscopic information captured by the light field camera in real time, or may acquire the stereoscopic information recorded in advance.

Next, in step S12, the image generation unit 1 generates the light field image to be displayed on each of the plurality of display surfaces 3. The light field image is generated using weighted non-negative matrix factorization (WNMF) according to the number of display surfaces 3. A specific generation method is described in the above-described Non-Patent Document.

Here, when the plurality of display surfaces 3 includes at least one second display surface 32 (for example, a monochrome display surface), it is necessary to devise a method of generating the light field image.

$T_{BW}$, which is the light transmittance of the second display surface 32, is defined using the following equation (1). $t_1$ to ty are the light transmittances of respective pixels two-dimensionally arranged on the second display surface 32. Since M pixels are two-dimensionally arranged, the light transmittance $T_{BW}$ of the second display surface 32 can be indicated by such an array.

[Math. 1]

$$T_{BW} = \begin{pmatrix} t_1 \\ \vdots \\ t_M \end{pmatrix} \tag{1}$$

$G_{RGB}$, which is the light transmittance of the first display surface 31, is defined using the following equation (2). $g_{R1}$ to $g_{RN}$, $g_{G1}$ to $g_{GN}$, and $g_{B1}$ to $g_{BN}$ indicate the light transmittances of the respective pixels two-dimensionally arranged on the first display surface 31. $g_{R1}$ to $g_{RN}$ are the light transmittances of red light, $g_{G1}$ to $g_{GN}$ are the light transmittances of green light, and $g_{B1}$ to $g_{BN}$ are the light transmittances of blue light. Since N pixels are two-dimensionally arranged, the light transmittance $G_{RGB}$ of the first display surface 31 can be expressed by such an array.

[Math. 2]

-continued $$G_{RGB} = \begin{pmatrix} g_{R1} \\ \vdots \\ g_{RN} \\ g_{G1} \\ \vdots \\ g_{GN} \\ g_{B1} \\ \vdots \\ g_{BN} \end{pmatrix} \quad (2)$$

Let L be brightness of the light ray in the light field to be reproduced. The brightness of the light field actually reproduced by the display surface 3 is L'. This L' can be obtained by an outer product of $T_{BW}$ and $G_{RGB}$ using the following equation (3).

[Math. 3]

$$L' = T_{BW} \otimes G_{RGB} = \begin{pmatrix} t_1 \\ \vdots \\ t_M \end{pmatrix} (g_{1R} \ \cdots \ g_{NB}) = \begin{pmatrix} t_1 g_{R1} & \cdots & t_1 g_{RN} \\ \vdots & \ddots & \vdots \\ t_M g_{B1} & \cdots & t_M g_{RN} \end{pmatrix} \quad (3)$$

To express L by the light transmittances $T_{BW}$ and $G_{RGB}$ of the display surface 3, it is necessary to bring L and L' as close as possible. Therefore, for example, it is considered to minimize a weighted Euclidean distance given in the following expression (4) as a loss function. Note that the loss function is not limited to the weighted Euclidean distance.

[Math. 4]

$$\operatorname{argmin}_{T,G}\left(\frac{1}{2}\|L - T_{BW}G_{RGB}\|_W^2\right) \quad (4)$$

W is an array representing a weight. Light that enters the user's field of view has a larger weight, and light that does not enter the user's field of view has a smaller weight. By considering the weight, a calculation speed of the image generation unit 1 is increased, and a time required for the calculation is greatly reduced.

To reduce the loss function of the expression (4), for example, weighted non-negative matrix factorization (WNMF) is used. In the WNMF, the light transmittance $T_{BW}$ of the second display surface 32 in the expression (4) is updated one after another using the following expression (5). Similarly, the light transmittance $G_{RGB}$ of the first display surface 31 in the expression (4) is updated one after another using the following expression (6).

[Math. 5]

$$T_{BW} \leftarrow T_{BM} \circ \frac{\left[G_{RGB}^T (W \circ L)\right]}{\left[G_{RGB}^T (W \circ (T_{BM} G_{RGB}))\right]} \quad (5)$$

[Math. 6]

$$G_{RGB}^T \leftarrow G_{RGB}^T \circ \frac{\left[(W \circ L) T_{BM}^T\right]}{\left[(W \circ (T_{BM} G_{RGB})) T_{BM}^T\right]} \quad (6)$$

To determine an image to be displayed in one frame, the updates given in the equations (5) and (6) are repeated. By repeating this update, a value close to the light field desired to be visually recognized by the user is calculated.

The description returns to FIG. 4. Next, in step S12, the image generation unit 1 transfers the light field image to each of the plurality of display surfaces 3. Thereby, each of the plurality of display surfaces 3 can display the light field image.

Finally, in step S13, the image generation unit 1 determines whether or not the frame processed in steps S11 and S12 is the last frame. When the frame is the last frame (step S13: Yes), the image generation unit 1 terminates the processing. When the frame is not the last frame (step S13: No), the image generation unit 1 performs the processing of steps S11 and S12 for the next frame.

Figure 5:
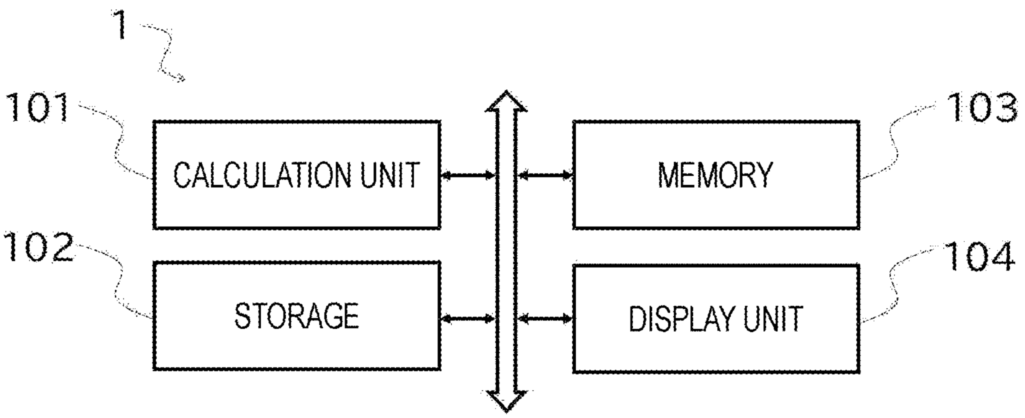
FIG. 5 is a flowchart illustrating an example of a flow of processing of the image generation unit 1 according to the embodiment of the present technology.

A hardware configuration of the image generation unit 1 will be described with reference to FIG. 5. FIG. 5 is a block diagram illustrating a configuration example of the image generation unit 1 according to the embodiment of the present technology. As illustrated in FIG. 5, the image generation unit 1 can include, for example, a calculation unit 101, a storage 102, a memory 103, and a display unit 104 as components. Each component is connected by, for example, a bus as a data transmission path.

The calculation unit 101 is configured by, for example, a central processing unit (CPU), a graphics processing unit (GPU), and the like. The calculation unit 101 controls each component included in the image generation unit 1 and performs the processing illustrated in FIG. 4.

The storage 102 stores programs used by the calculation unit 101, control data such as calculation parameters, image data, and the like. The storage 102 is implemented by using, for example, a hard disk drive (HDD) or a solid state drive (SSD), or the like.

The memory 103 temporarily stores, for example, a program executed by the calculation unit 101. The memory 103 is implemented by using, for example, a random access memory (RAM) or the like.

The display unit 104 displays information. The display unit 104 is implemented by, for example, a liquid crystal display (LCD), an organic light-emitting diode (OLED), or the like.

Although not illustrated, the image generation unit 1 may include a communication interface. The communication interface has a function to communicate via an information communication network using a communication technology such as Wi-Fi, Bluetooth (registered trademark), or long term evolution (LTE), for example.

For example, the image generation unit 1 may be configured by a server, or may be a smartphone terminal, a tablet terminal, a mobile phone terminal, a personal digital assistant (PDA), a personal computer (PC), a portable music player, a portable game machine, or a wearable terminal (head mounted display (HMD), glasses-type HMD, watch-type terminal, band-type terminal, or the like).

The program read by the calculation unit 101 may be stored in a computer device or a computer system other than the image generation unit 1. In this case, the image generation unit 1 can use a cloud service that provides the function of the program. Examples of the cloud service include software as a service (Saas), infrastructure as a service (IaaS), and platform as a service (PaaS), and the like.

Furthermore, the program can be stored using various types of non-transitory computer readable media and supplied to the computer. The non-transitory computer readable media include various types of tangible storage media. Examples of the non-transitory computer readable medium include a magnetic recording medium (for example, a flexible disk, a magnetic tape, or a hard disk drive), a magneto-optical recording medium (for example, a magneto-optical disk), a compact disc read only memory (CD-ROM), a CD-R, a CD-R/W, and a semiconductor memory (for example, a mask ROM, a programmable ROM (PROM), an erasable PROM (EPROM), a flash ROM, or a random access memory (RAM)). Furthermore, the above-described program may be supplied to the computer by various types of transitory computer readable media. Examples of the transitory computer readable medium include electrical signals, optical signals, and electromagnetic waves. The transitory computer readable medium can supply the above-described program to the computer via a wired communication path such as an electric wire and an optical fiber, or a wireless communication path.

The stereoscopic image display device according to the embodiment of the present technology can be a head mounted display (HMD) or the like worn on the head of the user. Alternatively, the stereoscopic image display device according to the embodiment of the present technology may be disposed at a predetermined place as an infrastructure.

[(4) Simulation Results]

Simulation results of the stereoscopic image display device according to the embodiment of the present technology will be described with reference to FIGS. 6 to 10. FIGS. 6 to 10 are explanatory diagrams illustrating examples of simulation results of the stereoscopic image display device according to the embodiment of the present technology. Each of the images in FIGS. 6 to 10 is an image in which an image (for example, a color image) displayed on the first display surface 31 (for example, a color display surface) and an image (for example, a monochrome image) displayed on the second display surface 32 (for example, a monochrome display surface) are superimposed.

Figure 6:
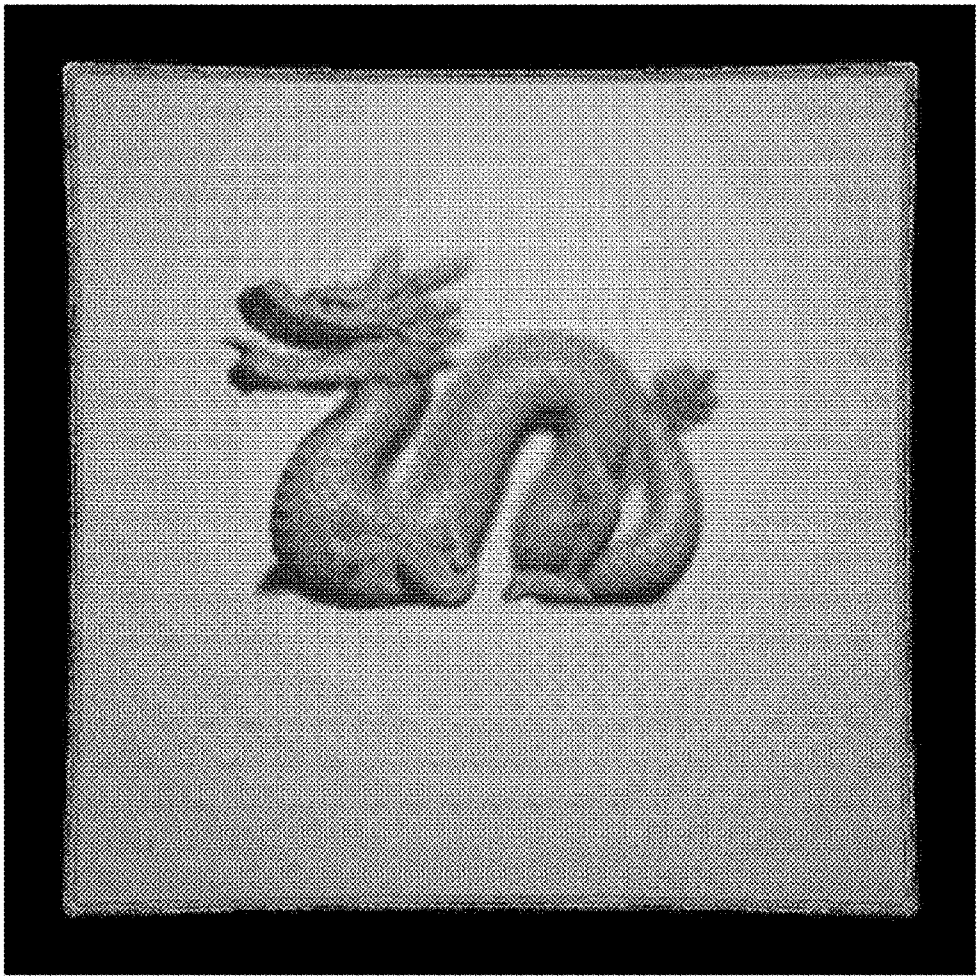
FIG. 6 is an explanatory diagram illustrating an example of a simulation result of the stereoscopic image display device according to the embodiment of the present technology.
Figure 7:
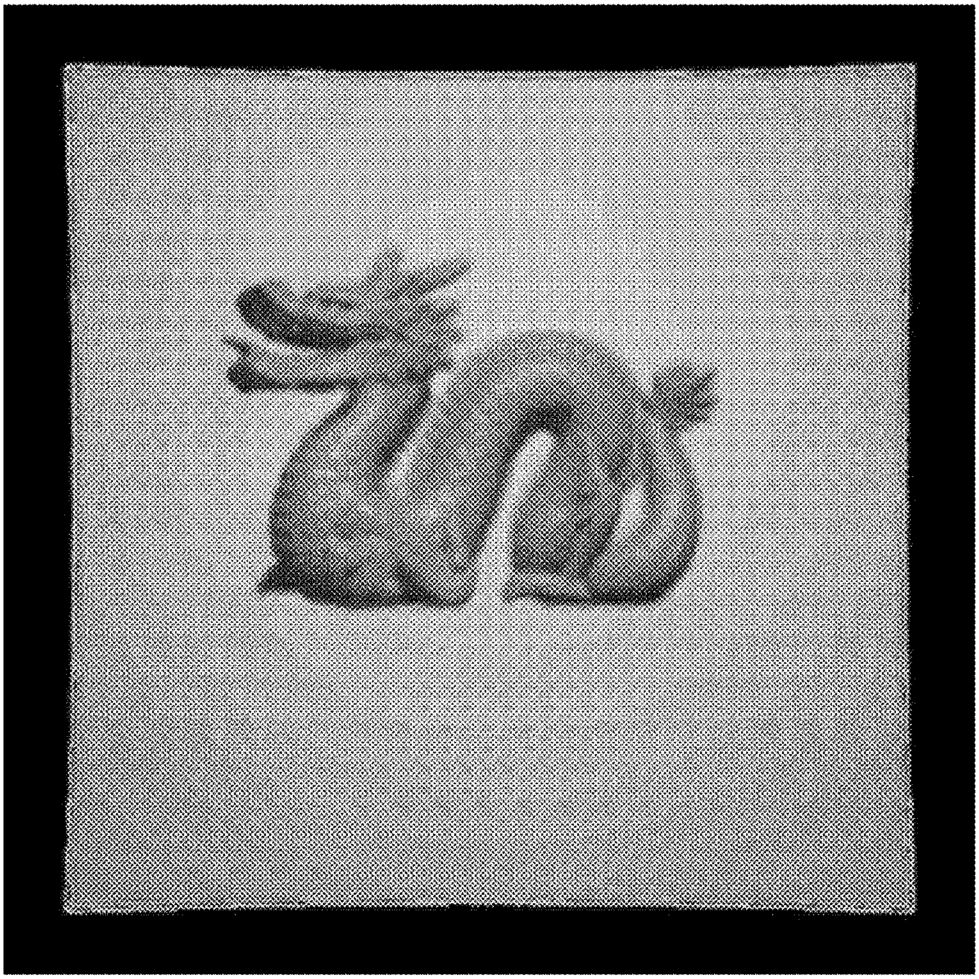
FIG. 7 is an explanatory diagram illustrating an example of a simulation result of the stereoscopic image display device according to the embodiment of the present technology.
Figure 8:
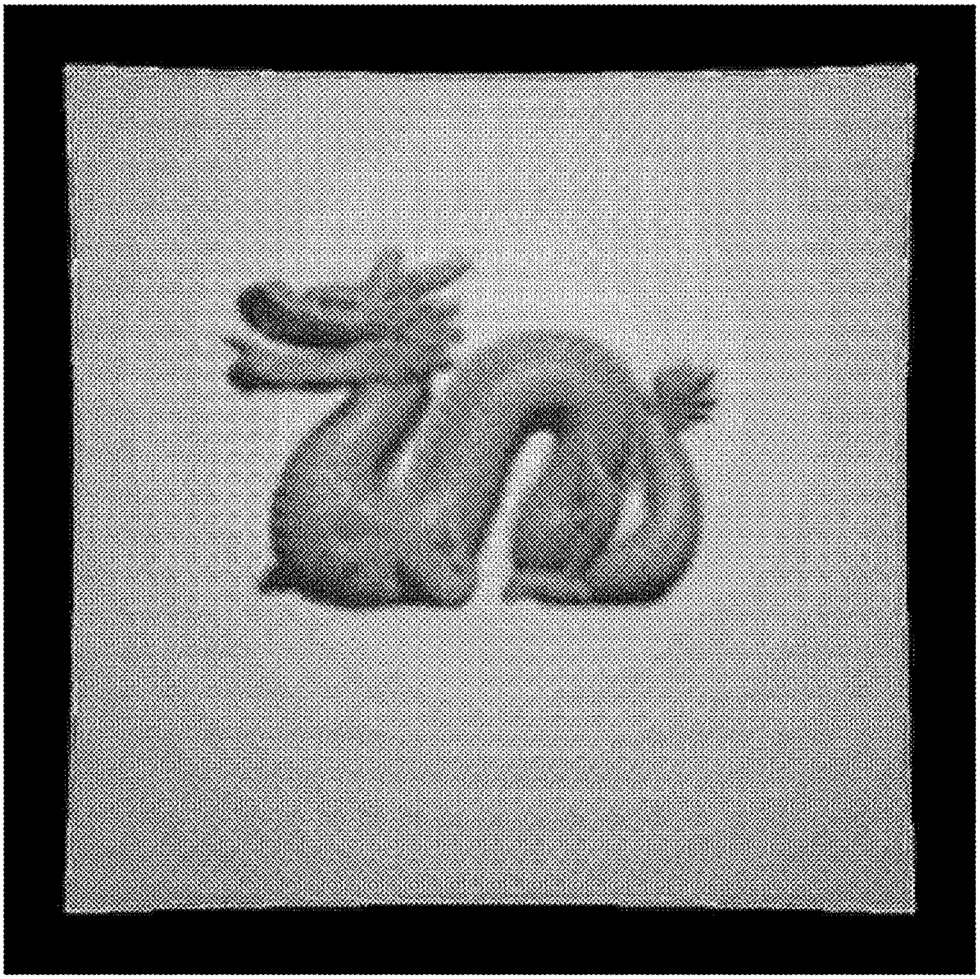
FIG. 8 is an explanatory diagram illustrating an example of a simulation result of the stereoscopic image display device according to the embodiment of the present technology.
Figure 9:
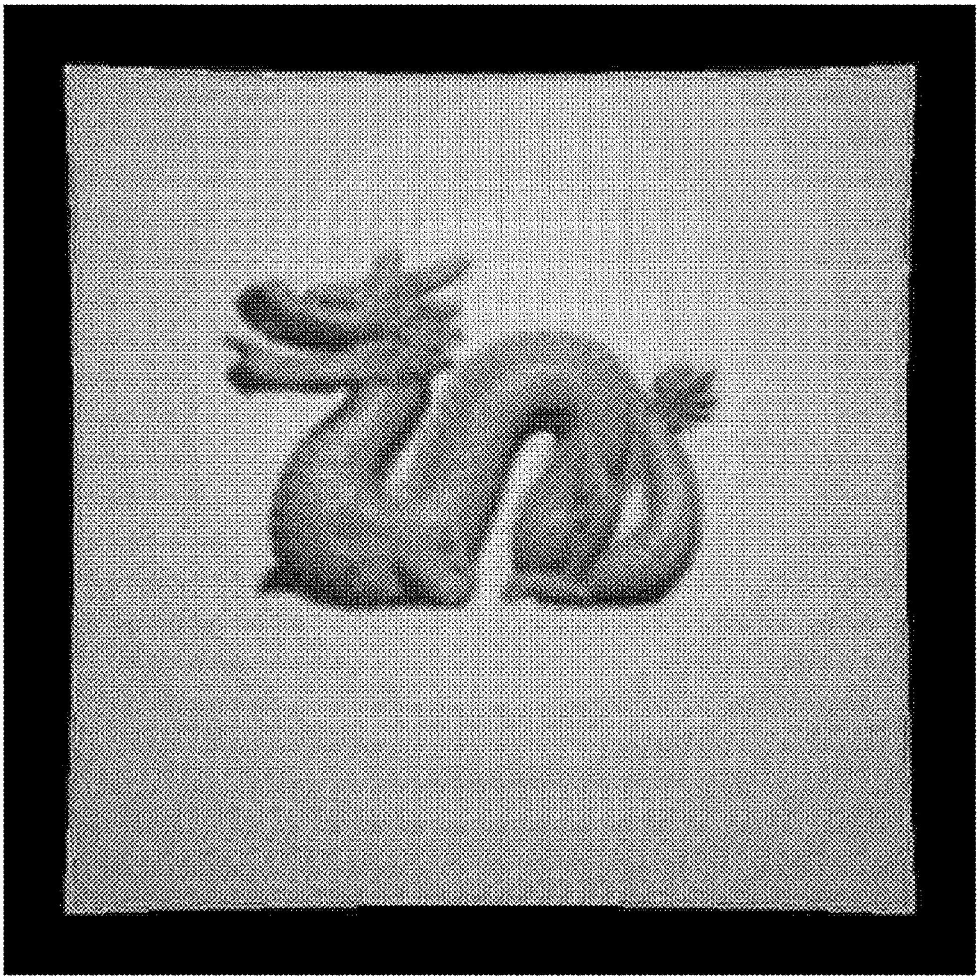
FIG. 9 is an explanatory diagram illustrating an example of a simulation result of the stereoscopic image display device according to the embodiment of the present technology.
Figure 10:
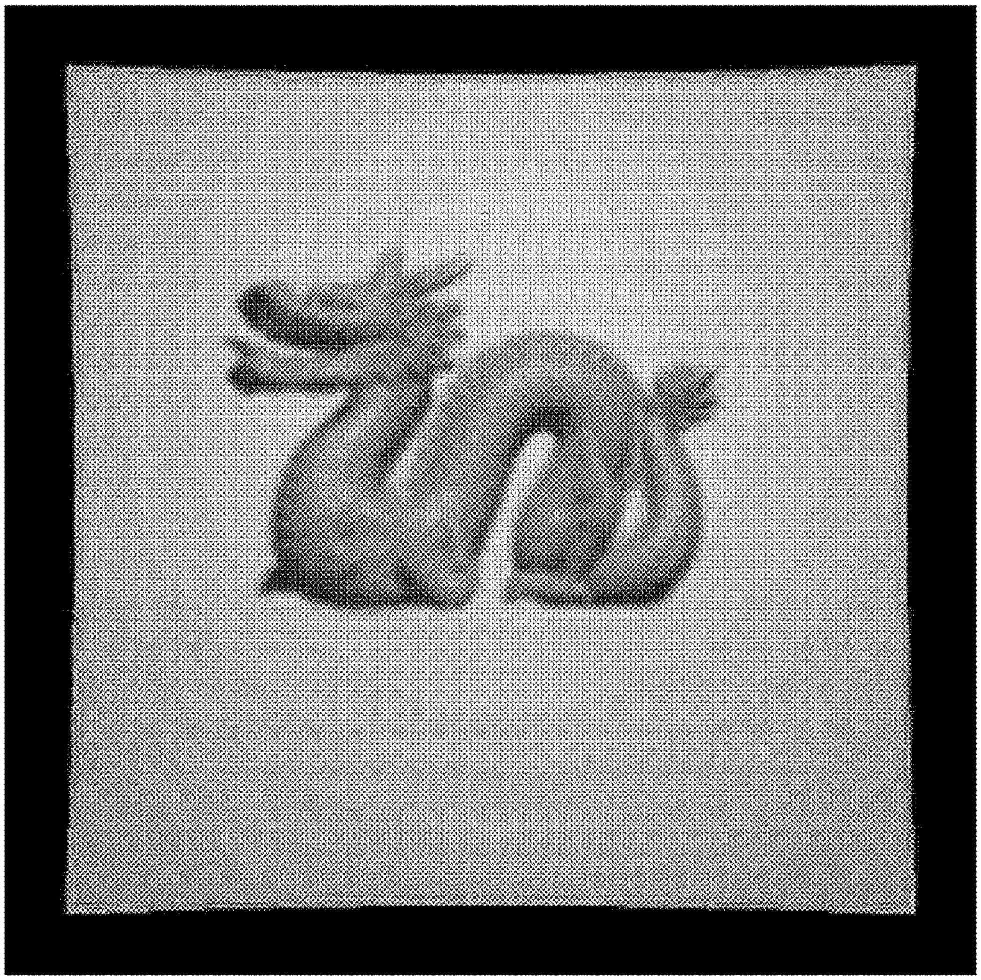
FIG. 10 is an explanatory diagram illustrating an example of a simulation result of the stereoscopic image display device according to the embodiment of the present technology.

FIG. 6 illustrates how the image looks when a focal length of the user is 300 mm. Similarly, FIG. 7 illustrates how the image looks when the focal length of the user is 500 mm. Similarly, FIG. 8 illustrates how the image looks when the focal length of the user is 1000 mm. Similarly, FIG. 9 illustrates how the image looks when the focal length of the user is 1500 mm. Similarly, FIG. 10 illustrates how the image looks when the focal length of the user is 2000 mm.

In FIG. 6, a head of a dragon is clearly seen, and a tail is seen blurred. As the focal length becomes longer, the head of the dragon changes to appear blurred. As described above, in the stereoscopic image display device according to the embodiment of the present technology, the depth can be accurately expressed.

The above content described for the stereoscopic image display device according to the first embodiment of the present technology can be applied to other embodiments of the present technology as long as there is no technical contradiction.

2. Second Embodiment (Example 2 of Stereoscopic Image Display Device)

Figure 11:
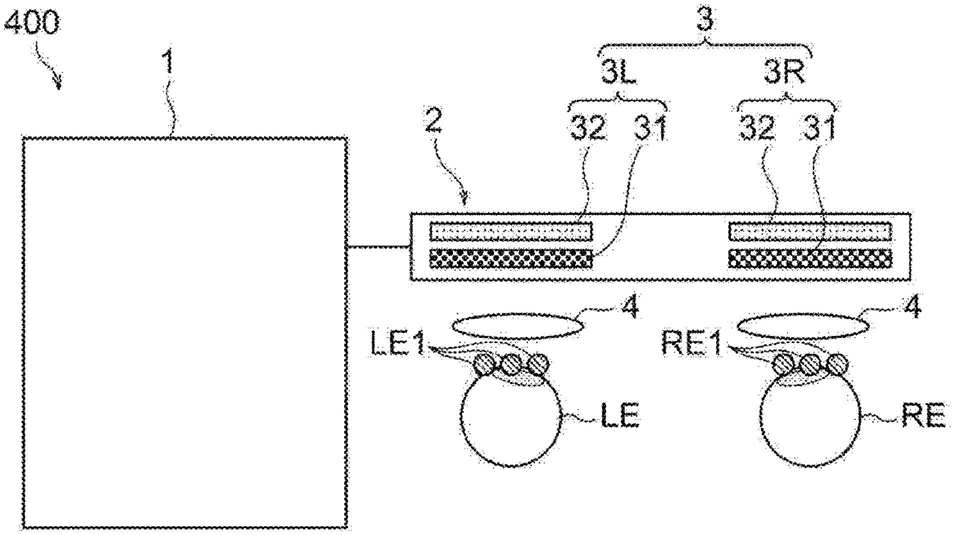
FIG. 11 is a block diagram illustrating a configuration example of a stereoscopic image display device 400 according to an embodiment of the present technology.

An image display unit according to an embodiment of the present technology may further include an eyepiece. This point will be described with reference to FIG. 11. FIG. 11 is a block diagram illustrating a configuration example of a stereoscopic image display device 400 according to the embodiment of the present technology. As illustrated in FIG. 11, an image display unit 2 further includes an eyepiece 4. The eyepiece 4 is disposed in front of both eyes of a user. In this case, the stereoscopic image display device 4 may be a head mounted display in which a display surface 3 is arranged in front of the both eyes of the user.

The eyepiece 4 generally has a magnification, an aberration, or both of the magnification and the aberration. The magnification is a ratio of a length by an optical system. The magnification includes a lateral magnification indicating a ratio of sizes of an image and an object, and a longitudinal magnification in an optical axis direction orthogonal to the lateral magnification.

The aberration is a phenomenon in which color bleeding, blur, distortion, or the like occurs in an image. The aberration includes a chromatic aberration that occurs in a case where a plurality of wavelengths of light is present and a monochromatic aberration that occurs in a case where there is one wavelength of light. The chromatic aberration includes an axial chromatic aberration and a lateral chromatic aberration. The monochromatic aberration includes a spherical aberration, a coma aberration, an astigmatism, an imaging plane aberration, and a distortion aberration.

When an image is displayed without considering the magnification and the aberration, for example, the size and depth of the image may not be correctly displayed, or color bleeding may occur.

Figure 12:
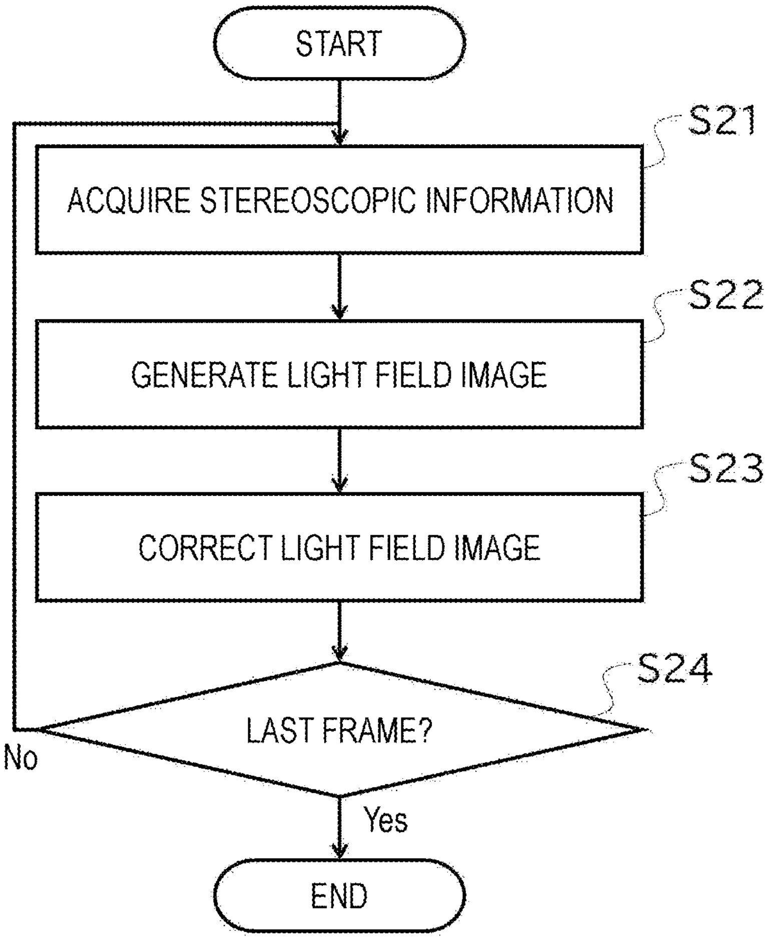
FIG. 12 is a flowchart illustrating an example of a flow of processing of an image generation unit 1 according to the embodiment of the present technology.

Therefore, it is preferable that an image generation unit 1 correct a light field image according to the magnification or the aberration of the eyepiece 4, or both of the magnification and the aberration. A flow of processing of the image generation unit 1 at this time will be described with reference to FIG. 12. FIG. 12 is a flowchart illustrating an example of a flow of processing of the image generation unit 1 according to the embodiment of the present technology.

As illustrated in FIG. 12, first, in step S21, the image generation unit 1 acquires stereoscopic information. Since this processing has been described in the first embodiment, repetitive description is omitted.

Next, in step S22, the image generation unit 1 generates a light field image to be displayed on each of a plurality of display surfaces 3. Since this processing has also been described in the first embodiment, repetitive description is omitted again.

Next, in step S23, the image generation unit 1 corrects the light field image according to the magnification or the aberration of the eyepiece 4, or both of the magnification and the aberration. Specifically, the light field image is reduced according to the magnification or the aberration of the eyepiece 4, or both of the magnification and the aberration.

Figure 13A:
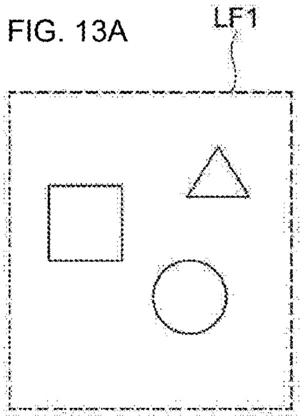
FIGS. 13A and 13B are schematic diagrams for describing processing of the image generation unit 1 according to the embodiment of the present technology.
Figure 13B:
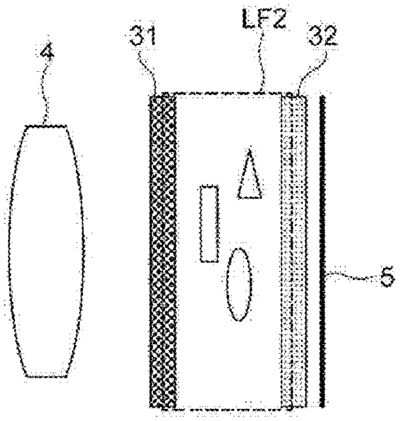

This point will be described with reference to FIGS. 13A and 13B. FIGS. 13A and 13B are schematic diagrams for describing processing of the image generation unit 1 according to an embodiment of the present technology. FIG. 13B illustrates a light source 5, a second display surface 32, a first display surface 31, and the eyepiece 4.

The light source 5, the second display surface 32, and the first display surface 31 display a light field LF2. The light field LF2 is enlarged and deformed by the magnification or the aberration of the eyepiece 4 or both of the magnification and the aberration, and is visually recognized by a user like a light field LF1 illustrated in FIG. 13A. Therefore, the light field LF2 is preferably corrected (reduced) in consideration of the magnification or the aberration of the eyepiece 4, or both of the magnification and the aberration. In step S23 of FIG. 12, the image generation unit 1 corrects the light field image according to the magnification or the aberration of the eyepiece 4, or both of the magnification and the aberration. As a result, an image size can be correctly displayed, and color bleeding or the like can be suppressed from occurring.

The description returns to FIG. 12. Finally, in step S24, the image generation unit 1 determines whether or not a frame processed in steps S21 to S23 is the last frame. When the frame is the last frame (step S24: Yes), the image generation unit 1 terminates the processing. When the frame is not the last frame (step S24: No), the image generation unit 1 performs the processing of steps S21 and S24 for the next frame.

Figure 14:
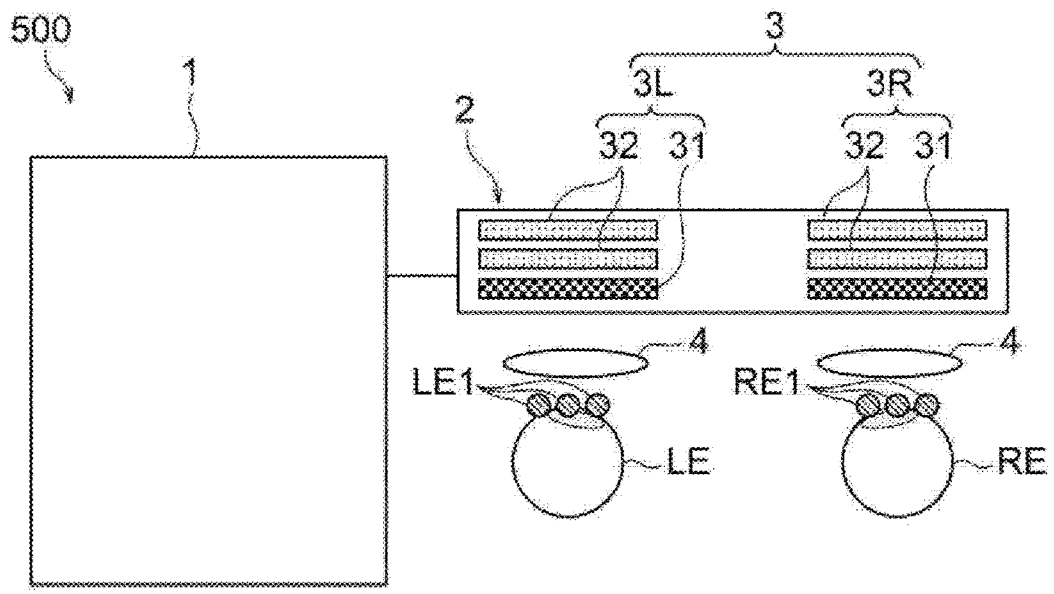
FIG. 14 is a block diagram illustrating a configuration example of a stereoscopic image display device 500 according to the embodiment of the present technology.

Note that it is needless to say that the type and the number of the display surfaces 3 are not particularly limited even in the embodiment illustrated in FIG. 11. For example, two or more of the plurality of display surfaces 3 may be the second display surfaces 32. This point will be described with reference to FIG. 14. FIG. 14 is a block diagram illustrating a configuration example of a stereoscopic image display device 500 according to an embodiment of the present technology. As illustrated in FIG. 14, two of the three display surfaces 3 are the second display surfaces 32. Thereby, for example, a light transmittance becomes higher than that of a configuration in which all of the three display surfaces 3 are the first display surfaces 31.

Note that it is needless to say that the order of the stacked first display surface 31 and second display surface 32 is not particularly limited.

The above content described for the stereoscopic image display device according to the second embodiment of the present technology can be applied to other embodiments of the present technology as long as there is no technical contradiction.

3. Third Embodiment (Example 3 of Stereoscopic Image Display Device)

Figure 15:
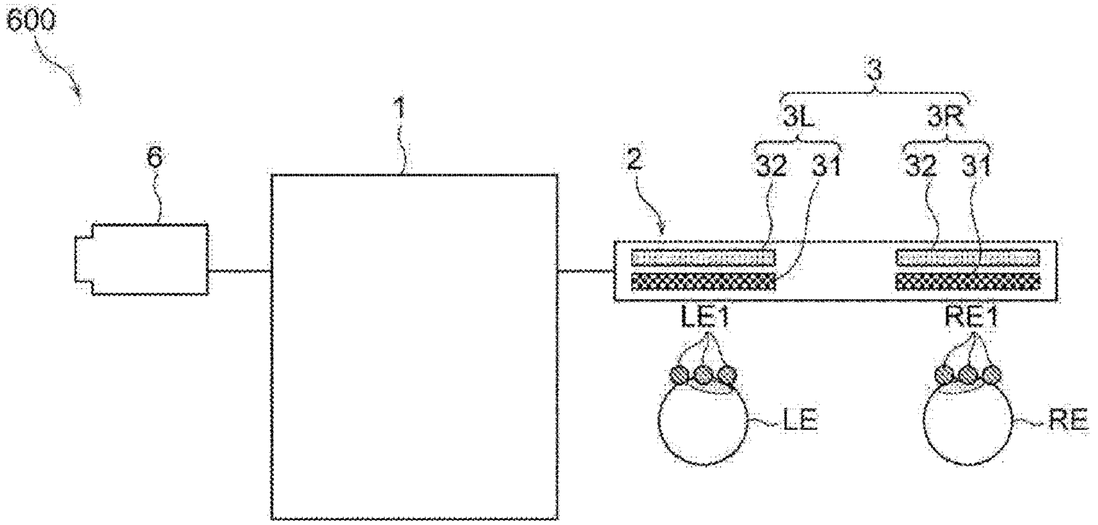
FIG. 15 is a block diagram illustrating a configuration example of a stereoscopic image display device 600 according to an embodiment of the present technology.

A stereoscopic image display device according to an embodiment of the present technology may further include a shape acquisition unit that images a stereoscopic shape to obtain stereoscopic information. At this time, an image generation unit generates a light field image on the basis of the stereoscopic information. This configuration will be described with reference to FIG. 15. FIG. 15 is a block diagram illustrating a configuration example of a stereoscopic image display device 600 according to the embodiment of the present technology. As illustrated in FIG. 15, the stereoscopic image display device 600 further includes a shape acquisition unit 6. The shape acquisition unit 6 images the stereoscopic shape from a plurality of viewpoints to obtain the stereoscopic information. The shape acquisition unit 6 outputs the stereoscopic information to an image generation unit 1. The image generation unit 1 generates a light field image on the basis of the stereoscopic information.

The stereoscopic information includes luminance information, depth information, or both of the luminance information and the depth information. At this time, the shape acquisition unit 6 may be, for example, an RGB-D camera. The RGB-D camera acquires a distance (depth information) to the stereoscopic shape in addition to a color image including the luminance information.

Alternatively, the shape acquisition unit 6 may be a light field camera. The light field camera may be by, for example, a camera array method, an encoding aperture method, or a microlens array method.

Alternatively, the shape acquisition unit 6 may be 3DCG software. The 3DCG software is software for producing three-dimensional computer graphics (3DCG). The 3DCG software renders the stereoscopic shape from a plurality of viewpoints to obtain the stereoscopic information.

Figure 16:
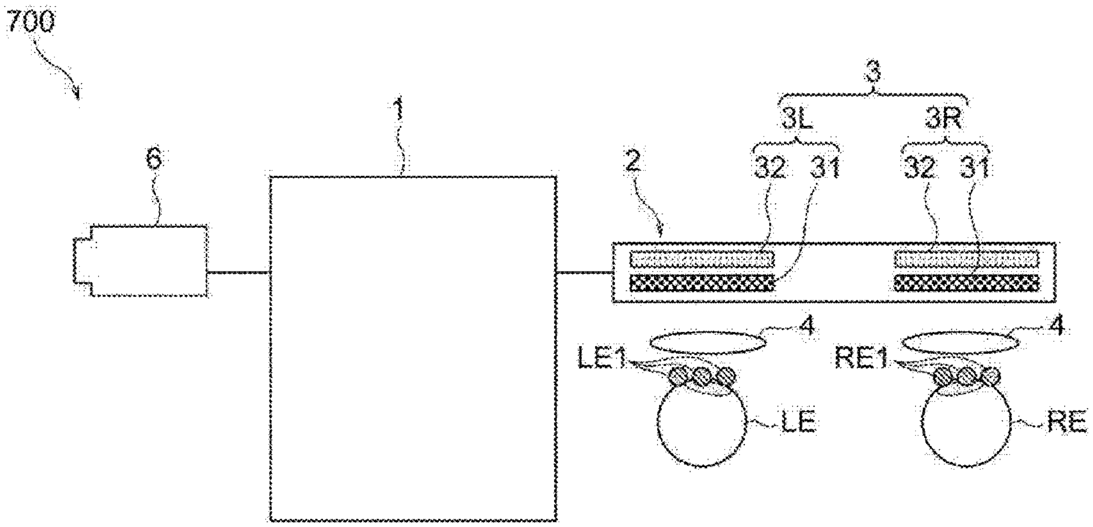
FIG. 16 is a block diagram illustrating a configuration example of a stereoscopic image display device 700 according to an embodiment of the present technology.

At this time, the stereoscopic image display device according to the embodiment of the present technology may further include an eyepiece. This point will be described with reference to FIG. 16. FIG. 16 is a block diagram illustrating a configuration example of a stereoscopic image display device 700 according to the embodiment of the present technology. As illustrated in FIG. 16, the stereoscopic image display device 700 further includes an eyepiece 4.

The image generation unit 1 generates a light field image on the basis of the stereoscopic information obtained by the shape acquisition unit 6. Then, the image generation unit 1 corrects the light field image according to a magnification or an aberration of the eyepiece 4, or both of the magnification and the aberration.

Note that, even in the embodiments illustrated in FIGS. 15 and 16, the type and the number of display surfaces 3 are not particularly limited. The order of stacked first display surface 31 and second display surface 32 is also not particularly limited.

The above content described for the stereoscopic image display device according to the third embodiment of the present technology can be applied to other embodiments of the present technology as long as there is no technical contradiction.

4. Fourth Embodiment (Example 4 of Stereoscopic Image Display Device)

Figure 17:
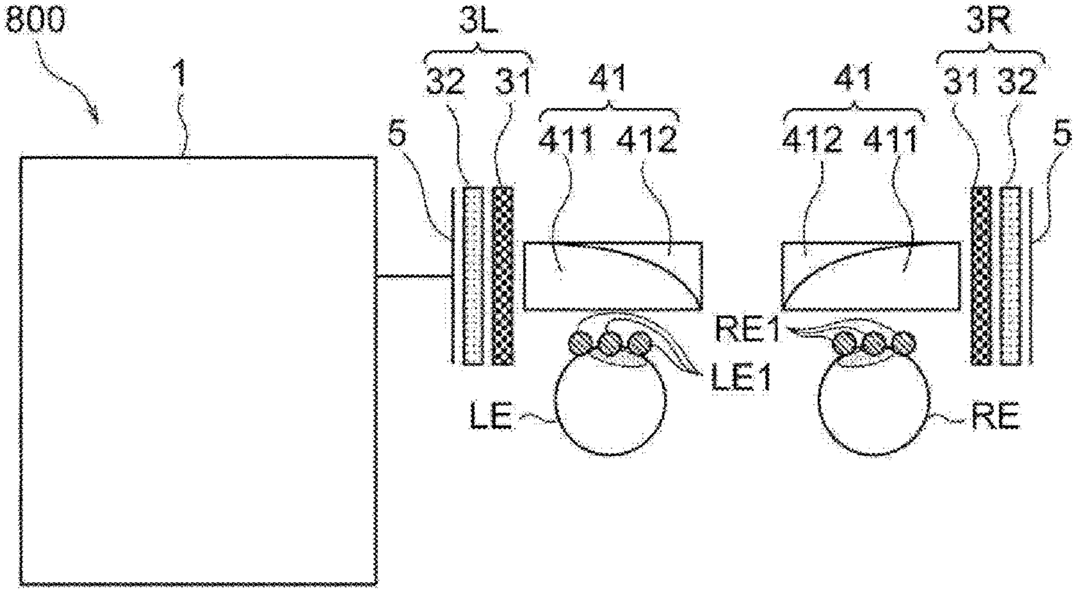
FIG. 17 is a block diagram illustrating a configuration example of a stereoscopic image display device 800 according to an embodiment of the present technology.

An eyepiece according to an embodiment of the present technology may be a freeform surface prism. This point will be described with reference to FIG. 17. FIG. 17 is a block diagram illustrating a configuration example of a stereoscopic image display device 800 according to the embodiment of the present technology. As illustrated in FIG. 17, the eyepiece is a freeform surface prism (freeform surface beam splitter) 41.

The freeform surface prism 41 for left eye LE of a user is configured by combining a first prism 411 and a second prism 412. The freeform surface prism 41 for right eye RE of the user is configured by combining the first prism 411 and the second prism 412.

A display surface 3L for the left eye LE and a light source 5 are not disposed in front of the left eye LE, but are disposed on a side surface of the left eye LE. A display surface 3R for the right eye RE and the light source 5 are not disposed in front of the right eye RE, but are disposed on a side surface of the right eye RE. Therefore, the user can visually recognize outside scenery.

An optical path of a light field emitted from the display surface 3L for the left eye LE is bent by the freeform surface prism 41 and reaches the left eye LE of the user. Then, a viewpoint group LE1 is formed on a cornea of the left eye LE. Similarly, an optical path of a light field emitted from the display surface 3R for the right eye RE is bent by the freeform surface prism 41 and reaches the right eye RE of the user. Then, the viewpoint group LE1 is formed on the cornea of the left eye LE, and a viewpoint group RE1 is formed on a cornea of the right eye RE.

At this time, the light source 5 and the display surfaces 3L and 3R are not arranged in front of the left eye LE and the right eye RE of the user. Therefore, the outside scenery transmitted through the freeform surface prism 41 is also incident on the left eye LE and the right eye RE. Therefore, the stereoscopic image display device 800 can cause the user to experience augmented reality (AR) by causing the light field to be generated and the outside scenery to be incident on the left eye LE and the right eye RE of the user.

Note that a lens other than the freeform surface prism 41 may be configured as the eyepiece as long as the optical paths of the light fields emitted from the display surface 3L and the display surface 3R can be bent. Alternatively, the light source 5 and the display surfaces 3L and 3R may be arranged in front of the left eye LE and the right eye RE of the user as long as the light source 5 and the display surfaces 3L and 3R having high light transmittances to an extent that the user can visually recognize the outside scenery can be implemented.

Figure 18:
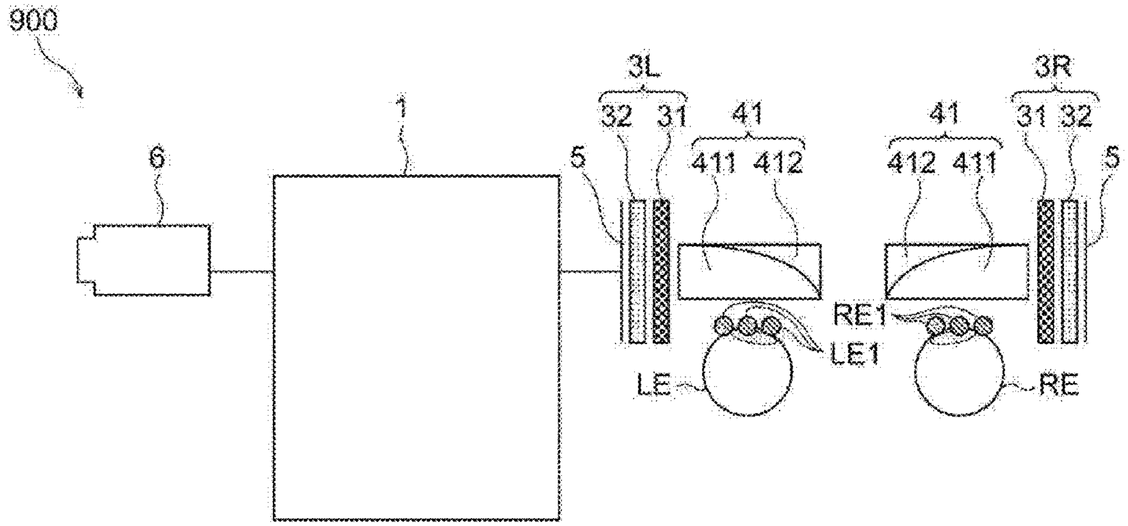
FIG. 18 is a block diagram illustrating a configuration example of a stereoscopic image display device 900 according to an embodiment of the present technology.

The stereoscopic image display device according to the embodiment of the present technology may further include a shape acquisition unit that images a stereoscopic shape to obtain stereoscopic information. At this time, an image generation unit generates a light field image on the basis of the stereoscopic information. This point will be described with reference to FIG. 18. FIG. 18 is a block diagram illustrating a configuration example of a stereoscopic image display device 900 according to the embodiment of the present technology. As illustrated in FIG. 18, the stereoscopic image display device 900 further includes a shape acquisition unit 6. The shape acquisition unit 6 images a stereoscopic shape from a plurality of viewpoints to obtain the stereoscopic information. The shape acquisition unit 6 outputs the stereoscopic information to an image generation unit 1. The image generation unit 1 generates a light field image on the basis of the stereoscopic information.

Note that, in the present embodiment, the type and the number of the display surfaces 3 are not particularly limited. The order of stacked first display surface 31 and second display surface 32 is also not particularly limited.

The above content described for the stereoscopic image display device according to the fourth embodiment of the present technology can be applied to other embodiments of the present technology as long as there is no technical contradiction.

5. Fifth Embodiment (Example of Stereoscopic Image Display Method)

The present technology provides a stereoscopic image display method including: generating a light field image at a predetermined viewpoint position; and causing light to be incident on each of both eyes of a user in order to display an image having a depth on the basis of the light field image, in which the light is transmitted through at least one first display surface and at least one second display surface having a higher light transmittance than the first display surface.

Figure 19:
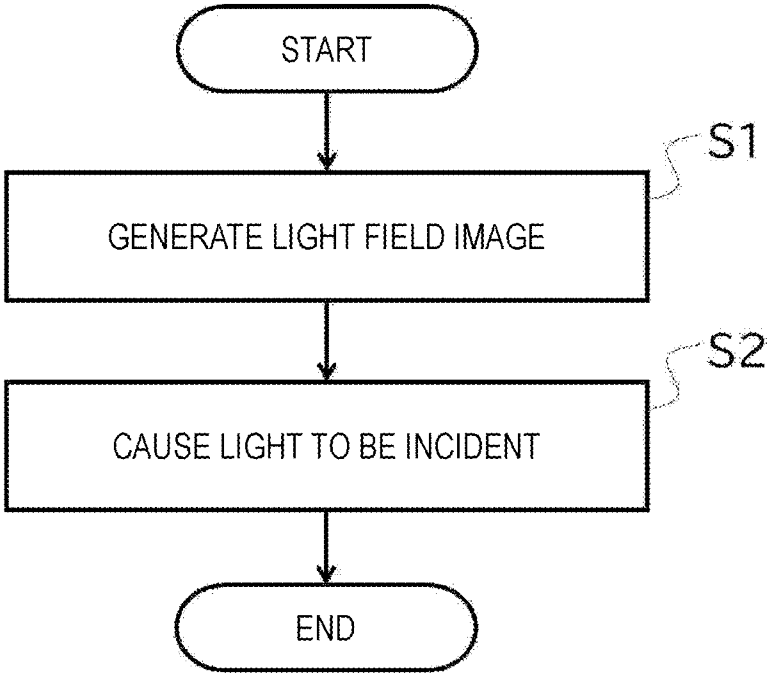
FIG. 19 is a flowchart illustrating an example of a stereoscopic image display method according to an embodiment of the present technology.

The stereoscopic image display method according to the embodiment of the present technology will be described with reference to FIG. 19. FIG. 19 is a flowchart illustrating an example of the stereoscopic image display method according to the embodiment of the present technology.

As illustrated in FIG. 19, first, in step S1, for example, a calculation unit included in a computer generates a light field image at a predetermined viewpoint position.

Next, in step S2, for example, a display surface such as a display causes light to be incident on each of both eyes of the user in order to display an image having a depth on the basis of the light field image. At this time, the light is transmitted through at least one first display surface and at least one second display surface having a higher light transmittance than the first display surface.

The above-described content described for the stereoscopic image display method according to the fifth embodiment of the present technology can be applied to other embodiments of the present technology as long as there is no technical contradiction.

Note that the embodiments according to the present technology are not limited to the above-described embodiments, and various modifications can be made without departing from the gist of the present technology.

Furthermore, the present technology may also adopt the following configurations.

[1]

A stereoscopic image display device including:

an image generation unit that generates a light field image at a predetermined viewpoint position; and an image display unit that displays an image having a depth in each of both eyes of a user on the basis of the light field image, in which the image display unit has a plurality of stacked display surfaces, and the plurality of display surfaces includes at least one first display surface and at least one second display surface having a higher light transmittance than the first display surface.

[2]

The stereoscopic image display device according to [1], in which the second display surface is a monochrome display surface.

[3]

The stereoscopic image display device according to [1] or [2], in which two or more of the plurality of display surfaces are the first display surfaces.

[4]

The stereoscopic image display device according to any one of [1] to [3], in which two or more of the plurality of display surfaces are the second display surfaces.

[5]

The stereoscopic image display device according to any one of [1] to [4], in which light incident on the both eyes is transmitted through the second display surface and the first display surface in this order.

[6]

The stereoscopic image display device according to any one of [1] to [5], in which a resolution of each of the plurality of display surfaces is different.

[7]

The stereoscopic image display device according to any one of [1] to [6], in which at least one of the plurality of display surfaces includes a spatial light modulator.

[8]

The stereoscopic image display device according to any one of [1] to [7], in which at least one of the plurality of display surfaces includes an LCD.

[9]

The stereoscopic image display device according to any one of [1] to [8], in which at least one of the plurality of display surfaces includes an OLED.

[10]

The stereoscopic image display device according to any one of [1] to [9], in which the image display unit further includes an eyepiece.

[11]

The stereoscopic image display device according to [10], in which the image generation unit corrects the light field image according to a magnification or an aberration of the eyepiece or both of the magnification and the aberration.

[12]

The stereoscopic image display device according to [10] or [11], in which the eyepiece is a freeform surface prism.

[13]

The stereoscopic image display device according to any one of [1] to [12], further including:

a shape acquisition unit that images a stereoscopic shape to obtain stereoscopic information, in which the image generation unit generates the light field image on the basis of the stereoscopic information.

[14]

The stereoscopic image display device according to [13], in which the stereoscopic information includes luminance information, depth information, or both of the luminance information and the depth information.

[15]

The stereoscopic image display device according to any one of [1] to [14], in which the display surface is a head mounted display disposed in front of the both eyes.

[16]

A stereoscopic image display method including:

generating a light field image at a predetermined viewpoint position; and causing light to be incident on each of both eyes of a user in order to display an image having a depth on the basis of the light field image, in which the light is transmitted through at least one first display surface and at least one second display surface having a higher light transmittance than the first display surface.

REFERENCE SIGNS LIST

100 Stereoscopic image display device
1 Image generation unit
2 Image display unit
3 Display surface
31 First display surface
32 Second display surface
4 Eyepiece
41 Freeform surface prism
5 Light source
6 Shape acquisition unit
S1 Generating a light field image
S2 Causing light to be incident

The invention claimed is:

1. A stereoscopic image display device, comprising:

an image generation unit configured to generate a light field image at a specific viewpoint position; and an image display unit configured to display an image based on the light field image, wherein the image is associated with a respective depth in each of a left eye and a right eye, the image display unit includes a plurality of stacked display surfaces, the plurality of stacked display surfaces includes each of a set of first type of display surfaces and a set of second type of display surfaces, and light transmittance of the set of second type of display surfaces is greater than a light transmittance of the set of first type of display surfaces.

2. The stereoscopic image display device according to claim 1, wherein each of the set of second type of display surfaces is a monochrome display surface.

3. The stereoscopic image display device according to claim 1, wherein the set of first type of display surfaces includes at least two display surfaces.

4. The stereoscopic image display device according to claim 1, wherein the set of second type of display surfaces includes at least two display surfaces.

5. The stereoscopic image display device according to claim 1, wherein the image is associated with light, the light is incident on each of the left eye of a user and the right eye of the user, the light transmits through the set of second type of display surfaces, and the light transmits through the set of first type of display surfaces after the light transmits through the set of second type of display surfaces.

6. The stereoscopic image display device according to claim 1, wherein each of the plurality of stacked display surfaces is associated with a different resolution.

7. The stereoscopic image display device according to claim 1, wherein at least one of the plurality of stacked display surfaces includes a spatial light modulator.

8. The stereoscopic image display device according to claim 1, wherein at least one of the plurality of stacked display surfaces includes an LCD.

9. The stereoscopic image display device according to claim 1, wherein at least one of the plurality of stacked display surfaces includes an OLED.

10. The stereoscopic image display device according to claim 1, wherein the image display unit further includes an eyepiece.

11. The stereoscopic image display device according to claim 10, wherein the image generation unit is further configured to correct the light field image based on at least one of a magnification of the eyepiece or an aberration of the eyepiece.

12. The stereoscopic image display device according to claim 10, wherein the eyepiece is a freeform surface prism.

13. The stereoscopic image display device according to claim 1, further comprising a shape acquisition unit configured to image a stereoscopic shape, wherein the image generation unit is further configured to:

acquire stereoscopic information based on the stereoscopic shape; and generate the light field image based on the stereoscopic information.

14. The stereoscopic image display device according to claim 13, wherein the stereoscopic information includes at least one of luminance information or depth information.

15. The stereoscopic image display device according to claim 1, wherein each of the plurality of stacked display surfaces is a head mounted display, and each of the plurality of stacked display surfaces is in front of the left eye and the right eye.

16. A stereoscopic image display method, comprising:

generating a light field image at a specific viewpoint position;

directing light on each of a left eye and a right eye; and displaying an image based on the light field image and the light, wherein the image is associated with a respective depth in the each of the left eye and the right eye, the light transmits through each of a first display surface and a second display surface, and light transmittance of the second display surface is greater than a light transmittance of the first display surface.

* * * * *